(12) United States Patent
Rüf et al.

(10) Patent No.: US 10,577,723 B2
(45) Date of Patent: Mar. 3, 2020

(54) FLAME RETARDANT CELLULOSIC MAN-MADE FIBERS

(71) Applicant: LENZING AG, Lenzing (AT)

(72) Inventors: Hartmut Rüf, Schörfling (AT);
Clemens Bisjak, Weyregg (AT); Gert Kroner, Lenzing (AT)

(73) Assignee: Lenzing AG, A-4860 Lenzing (AT)

( * ) Notice: Subject to any disclaimer, the term of this patent is extended or adjusted under 35 U.S.C. 154(b) by 151 days.

(21) Appl. No.: 14/050,926

(22) Filed: Oct. 10, 2013

(65) Prior Publication Data
US 2014/0037933 A1 Feb. 6, 2014

Related U.S. Application Data

(63) Continuation of application No. 13/993,718, filed as application No. PCT/AT2011/000489 on Dec. 9, 2011, now Pat. No. 9,988,743.

(30) Foreign Application Priority Data

Dec. 20, 2010 (AT) .................................. A 2096/2010
May 23, 2011 (AT) .................................. A 742/2011

(51) Int. Cl.
| | | |
|---|---|---|
| *D01D 5/26* | (2006.01) |
| *D01F 2/06* | (2006.01) |
| *D01F 1/07* | (2006.01) |
| *D01F 2/02* | (2006.01) |
| *C09K 21/12* | (2006.01) |
| *D01D 5/06* | (2006.01) |
| *D01F 2/00* | (2006.01) |
| *D01F 2/08* | (2006.01) |
| *C09K 21/10* | (2006.01) |

(52) U.S. Cl.
CPC .............. *D01D 5/26* (2013.01); *C09K 21/12* (2013.01); *D01D 5/06* (2013.01); *D01F 1/07* (2013.01); *D01F 2/00* (2013.01); *D01F 2/02* (2013.01); *D01F 2/06* (2013.01); *D01F 2/08* (2013.01); *C09K 21/10* (2013.01); *Y10T 428/249921* (2015.04); *Y10T 428/2933* (2015.01); *Y10T 442/696* (2015.04)

(58) Field of Classification Search
CPC .............. D06M 13/288; D06M 15/431; D06M 13/285; D06M 2101/04; D06P 3/8252; D06P 1/667; C08G 79/02; C09K 21/12; D02G 3/047; D02G 3/443; D03D 15/12; D04H 1/42; D10B 2201/00; D10B 2331/021; D10B 2331/02; Y10T 428/2915; Y10T 442/3976; Y10T 442/3065; Y10T 428/2904; D01F 2/00; D01F 11/02

USPC .............. 428/359, 365, 296.7; 264/129, 203, 264/211.14; 106/18.17, 18.19, 18.14, 106/200.3; 252/8.61, 608; 564/12, 15; 8/127.1, 181, 195, 490, 584, 585

See application file for complete search history.

(56) References Cited

U.S. PATENT DOCUMENTS

| | | | |
|---|---|---|---|
| 2,909,446 A | 10/1959 | Redfarn et al. | |
| 3,236,676 A | 2/1966 | Coates et al. | |
| 3,266,918 A | 8/1966 | Schappel et al. | |
| 3,455,713 A | 7/1969 | Godfrey | |
| 3,505,087 A | 4/1970 | Godfrey | |
| 3,532,526 A | 10/1970 | Godfrey | |
| 3,619,223 A | 11/1971 | Brower et al. | |
| 3,645,936 A | 2/1972 | Gardner | |
| 3,845,167 A | 10/1974 | Franko-Filipasic et al. | |
| 3,947,276 A * | 3/1976 | Siclari ...................... C07F 9/54 106/166.2 |
| 3,957,927 A | 5/1976 | Wurmb et al. | |
| 3,985,834 A | 10/1976 | Kao | |
| 3,986,882 A | 10/1976 | Franko-Filipasic et al. | |
| 3,990,900 A | 11/1976 | Franko-Filipasic et al. | |
| 3,994,996 A | 11/1976 | Franko-Filipasic et al. | |
| 4,040,843 A | 8/1977 | Franko-Filipasic et al. | |
| 4,062,687 A | 12/1977 | Mauric et al. | |
| 4,063,883 A | 12/1977 | Hupfl et al. | |
| 4,083,833 A | 4/1978 | Siclari et al. | |
| 4,111,701 A | 9/1978 | Franko-Filipasic et al. | |
| 4,193,805 A | 3/1980 | Mauric et al. | |
| 4,220,472 A | 9/1980 | Mauric et al. | |
| 4,242,138 A | 12/1980 | Mauric et al. | |
| 4,311,855 A * | 1/1982 | Cole ...................... C08G 79/02 106/18.17 |

(Continued)

FOREIGN PATENT DOCUMENTS

| | | |
|---|---|---|
| DE | 77040 A | 11/1970 |
| DE | 2429254 A1 | 1/1975 |

(Continued)

OTHER PUBLICATIONS

International Search Report issued in PCT/AT2011/000489, dated Mar. 12, 2012 (4 pages).
International Preliminary Report on Patentability issued in PCT/AT2011/000489, dated Jun. 25, 2013 (14 pages).
Horrocks, A. R. and Kandola, B. K.: "Flame retardant cellulosic textiles" in Spec. Publ.—R. Soc. Chem. Band 224 (1998) pp. 343-362.
"Testing Methods viscose, modal, lyocell and acetate staple fibres and tows," BISFA, 2004 ed. (69 pages).
K. Bredereck and F. Hermanutz "Man-mode cellulosics," Rev. Prog. Color, 35, pp. 59-75 (2005).

Primary Examiner — Hai Vo
(74) Attorney, Agent, or Firm — Venable LLP

(57) ABSTRACT

The invention relates to flame-retardant cellulosic man-made fibers containing a flame-retardant substance in the form of an oxidized condensate of a tetrakis hydroxyalkyl phosphonium salt with ammonia and/or a nitrogenous compound which contains one or several amine groups whereby the fiber has a tenacity of more than 18 cN/tex in a conditioned state. Production process and the use of the fibers according to the invention are further objects of the invention.

18 Claims, No Drawings

(56) References Cited

U.S. PATENT DOCUMENTS

| | | |
|---|---|---|
| 4,543,409 A | 9/1985 | Diamantoglou et al. |
| 4,571,310 A | 2/1986 | Tanino et al. |
| 4,806,620 A | 2/1989 | Klett et al. |
| 5,238,464 A * | 8/1993 | Johnson ............... D06M 13/288 |
| | | 252/608 |
| 5,417,752 A | 5/1995 | Paren et al. |
| 5,690,874 A * | 11/1997 | Bell .......................... D01F 2/00 |
| | | 106/18.14 |
| 6,130,327 A | 10/2000 | Wolf et al. |
| 6,423,251 B1 | 7/2002 | Blount |
| 6,893,492 B2 | 5/2005 | White et al. |
| 7,837,916 B2 | 11/2010 | Paren et al. |
| 8,500,956 B2 | 8/2013 | Sixta et al. |
| 2004/0126555 A1* | 7/2004 | Hartmann .................. D01F 1/10 |
| | | 428/296.7 |
| 2005/0025962 A1* | 2/2005 | Zhu ......................... D02G 3/047 |
| | | 428/359 |
| 2008/0032128 A1* | 2/2008 | Schmidtbauer ........... D01F 1/10 |
| | | 428/372 |
| 2008/0093767 A1 | 4/2008 | Paren et al. |
| 2008/0233821 A1 | 9/2008 | Ruf et al. |
| 2009/0321025 A1 | 12/2009 | Weightman et al. |
| 2010/0019213 A1 | 1/2010 | Tian et al. |
| 2010/0190402 A1 | 7/2010 | Tozzi-Spadoni et al. |
| 2012/0156486 A1 | 6/2012 | Bisjak et al. |
| 2013/0337715 A1 | 12/2013 | Ruf et al. |

FOREIGN PATENT DOCUMENTS

| | | |
|---|---|---|
| DE | 24 51 802 A1 | 5/1975 |
| DE | 26 22 569 A1 | 12/1976 |
| DE | 41 28 638 A1 | 3/1992 |
| DE | 10 2005 062 608 A1 | 7/2007 |
| EP | 0 619 848 B1 | 1/1999 |
| EP | 0 836 634 B1 | 10/2002 |
| EP | 1 918 431 A1 | 5/2008 |
| EP | 1 753 900 B1 | 11/2008 |
| GB | 1464545 A | 2/1977 |
| GB | 1468799 A | 3/1977 |
| GB | 1487937 A | 10/1977 |
| GB | 1521404 A | 8/1978 |
| JP | 50046920 A | 4/1975 |
| JP | 51136914 A | 11/1976 |
| KR | 20090025979 | 8/2012 |
| WO | 93/12173 A2 | 6/1993 |
| WO | 94/26962 A1 | 11/1994 |
| WO | 96/05356 A1 | 2/1996 |
| WO | 97/02315 A1 | 1/1997 |
| WO | 2007/022552 A1 | 3/2007 |

* cited by examiner

FLAME RETARDANT CELLULOSIC MAN-MADE FIBERS

This application is a continuation of U.S. Non-Provisional application Ser. No. 13/993,718, filed on Jun. 13, 2013, which is a national stage filing under 35 U.S.C. § 371 of International Patent Application No. PCT/AT2011/000489, filed Dec. 9, 2011 which claims priority to Australian Patent Application Nos. A 2096/2010, filed Dec. 20, 2010 and A 742/2011, filed May 23, 2011, all of which are incorporated herein by reference in their entirety.

BACKGROUND OF THE INVENTION

Field of the Invention

The invention relates to cellulosic man-made fibers with permanently flame-retardant properties whereby the flame-retardant property is arrived at by adding an oxidized condensate of tetrakis hydroxyalkyl phosphonium salt with ammonia and/or a compound containing nitrogen which contains one or several amine groups, to the spinning mass and/or the spinning solution and the fiber reveals a strength (tensile strength) in the conditioned state of more than 18 cN/tex.

Description of the Related Art

The cellulosic man-made fibers can be viscose/modal, cupro, or lyocell fibers. Lyocell fibers are defined by BISFA (The International Bureau for the Standardization of Man-made Fibers) as cellulosic man-made fibers which are spun from an organic solvent without the derivatisation of the cellulose (the direct spinning process). This also means fibers which are spun from solutions of cellulose in ionic liquids.

An overview of the methods used to render cellulosic textiles flame-retardant and the mechanisms used for this is supplied by the publication: Horrocks, A. R.; Kandola, B. K. "Flame Retardant Cellulosic Textiles" Spec. Publ.—Royal Society of Chemistry, volume 224, year 1998, pages 343-362. The methods described differ in the element responsible for the flame-retardation (mainly phosphorus, however, nitrogen, boron and sulphur as well), the place of the application (surface treatment mainly with cotton, additive in fiber production with man-made fibers) and the permanency (degree of resistance of flame-retardant properties to laundering treatments).

A large share of the permanently flame-retardant cellulosic textiles is produced by finishing cotton fabrics with tetrakis (hydroxymethyl)phosphonium derivatives (e.g. Proban® finish) respectively with N-methylol dialkyl-phosphonopropionamides (e.g. Pyrovatex CP®). The finished textiles do, however, have a very hard hand.

Among the cellulosic man-made fibers, a large number of substances were suggested as flame-retardant additives for viscose fibers in fiber production.

In U.S. Pat. No. 3,266,918 Tris(2,3-bromopropyl)phosphate is suggested as the flame-retardant agent. A fiber of this kind was produced for some time on an industrial scale. Production was, however, discontinued due to the toxicity of the flame-retardant agent.

A class of substances used as a flame-retardant agent is that of substituted phosphazenes. A flame-retardant viscose fiber was produced at industrial level on the basis of these substances (U.S. Pat. No. 3,455,713). The flame-retardant agent is however in liquid form and can only be spun into viscose fibers with a lower yield (approx. 75 weight percent) and it tends to migrate out of the fiber thus giving the fiber an undesirable stickiness.

Similar compounds were described in patents but were never tried for viscose fibers on an industrial scale (BP 1,521,404; U.S. Pat. Nos. 2,909,446, 3,986,882; JP 50046920; DE 2,429,254; GB 1,464,545; U.S. Pat. No. 3,985,834; 4,083,833; 4,040,843; 4,111,701; 3,990,900; 3,994,996; 3,845,167; 3,532,526; 3,505,087; 3,957,927). All of these substances are in liquid form and demonstrate the same disadvantages as in U.S. Pat. No. 3,455,713.

Apart from the above named Tris(2,3-bromopropyl)phosphate, a series of other organophosphates respectively phosphonic acid amides and esters were described as flame-retardant agents for viscose fibers (DE 2,451,802; DE 2,622,569; U.S. Pat. Nos. 4,193,805; 4,242,138; JP 51-136914; DE 4,128,638).

Of this class of substances, until now only the compound 2,2'-oxybis[5,5-dimethyl-1,3,2-dioxaphosphorinane]2,2 fulfils the requirements with regard to the effectiveness (the necessary amount of incorporation in order to fulfil EN ISO 15025:2002), quantitative yield in the spinning process and halogen free.

Apart from the phosphorus compounds mentioned above, flame-retardant viscose fibers were described which contain silicic acid (EP 619,848; EP 1,753,900; EP 1,918,431). These fibers pass the flame test described above, however, only with high contents of silicic acid. Due to the high content of pigment which does not contribute to the tenacity, the fibers do not attain the necessary fiber tenacities required for textile applications.

In a series of patent applications, ways were described to impart flame-retardant properties to cellulosic fibers, which are produced according to the amine oxide-process. WO 93/12173 describes triazine compounds containing phosphorus as a flame-retardant agent for plastic materials, in particular polyurethane foam. Cellulose is mentioned in claim 18, spun from a solution in a tertiary amine oxide, without citing an example with regard to the actual suitability of the compounds as flame-retardant agents for cellulose.

WO 94/26962 describes the addition of a tetrakis hydroxymethyl phosphonium chloride (THPC)—urea—precondensate to the wet fiber prior to drying, ammonia-treatment, condensation, oxidation and drying after a second washing step. However, condensation reactions at fiber level significantly impair the fiber properties (embrittlement).

In WO 96/05356, lyocell fibers are treated with phosphoric acid and urea and kept at 150° C. for 45 minutes. This process also damages the mechanical properties of the fibers to a considerable extent.

EP 0 836 634 describes the incorporation of compounds containing phosphorus as flame-retardant agents for regenerated cellulose fibers, particularly lyocell fibers. 1,4-di-isobutyl-2,3,5,6-tetrahydroxy-1,4-dioxophosphorinane is cited as an example. The process has the disadvantage that the incorporation yield of the flame-retardant agent only equals 90% and thus problems occur in the closed solvent loops involved in the lyocell process.

U.S. Pat. No. 6,893,492 and WO 2007/022552 describe clay minerals (montmorillonite and/or hectorite) as an additive for lyocell fibers. The flame-retardant effect of these additives does not, however, suffice for textile products, which have to pass the vertical flame test, according to EN ISO 15025:2002 process B—edge flaming.

In the Korean patent application, Kongkae Taeho Kongbo 2009/025979, a flame-retardant agent containing phosphorus is bonded to the cellulose via a silicon-oxygen group. This bond is, however, sensitive to hydrolysis and so the product is not suitable for washables.

None of the methods described for the lyocell process has become important in technical terms. One important reason for this is that the closed solvent loops in this process place special demands on the yield when incorporating a solid or liquid additive in the spinning mass. The recovery of solvent equals more than 99%. Even small amounts of impurities which get into the spinning bath/washing water build up in the closed solvent loops as a result of the non quantitative yield of incorporation and lead to problems when spinning and when reprocessing/cleaning the solvent.

No patent applications have been announced to date for flame-retardant lyocell fibers, made from ionic liquids ("ionic liquids"). Likewise no patent applications are known for fibers according to the cupro or carbamate process. According to BISFA, cupro fibers are a separate fiber genre. In the following, fibers according to the carbamate process are called carbamate fibers.

The use of tetrakis hydroxymethyl phosphonium chloride (THPC)—urea—pre-condensates for the flame-retardant finishing of in particular cotton, involving the process steps impregnation with the precondensate—treatment with ammonia—condensation—oxidation (e.g. the Proban®—process), is known.

The use of fully condensed products is described in U.S. Pat. No. 3,645,936. According to the teaching of the patent, the incorporation of an ammonia/tetrakis hydroxymethyl phosphonium chloride—polymer (THPC/NH$_3$-polymer) solely with the amount of incorporation which is required to pass the flame test (20%), leads to fibers of insufficient tenacity (1.08 g/den=approx. 9.7 cN/tex).

SUMMARY OF THE INVENTION

Surprisingly it has been found that flame-retardant cellulosic man-made fibers possessing a higher tenacity can be obtained by applying a flame-retardant substance as a flame-retardant agent, which is based on a class of compounds known from U.S. Pat. No. 3,645,936.

DETAILED DESCRIPTION OF THE INVENTION

The flame-retardant cellulosic man-made fibers in accordance with the invention contain a flame-retardant substance in the form of an oxidized condensate from a tetrakis hydroxyalkyl phosphonium salt with ammonia and/or a nitrogen-rich compound which contains one or several amine groups, and are characterized in that the fiber reveals a strength of more than 18 cN/tex in the conditioned state.

The nitrogenous compound is preferably urea or ammonia.

The flame-retardant cellulosic man-made fibers in accordance with the invention can be viscose fibers or modal fibers. Other fibers according to the invention can be produced using the cupro or carbamate process.

The production of viscose and modal fibers is generally known. In this respect the addition of functional additives is generally performed by means of adding an aqueous dispersion to the spinning mass (viscose).

A process which involves the following steps is particularly well suited
 production of a viscose from cellulose xanthogenate
 by adding a modification agent
 addition of 5 weight percent up to 50 weight percent in relation to the cellulose of the flame-retardant substance in the form of an aqueous dispersion of the pigment
 spinning of the spinning mass though a spinneret into the spin bath
 stretching of the precipitated filaments
 after-treatment after washing, bleaching, finishing
 cutting to staple fibers,
 and is characterized in that for the production of fiber
 the pulp used has an R-18 content of 93-98%
 the cellulose content of the viscose lies between 4 weight percent and 7 weight percent
 the alkali ratio lies between 0.7 and 1.5
 the carbon disulphide input equals 36 weight percent to 42 weight percent in relation to the cellulose
 between 1 weight percent and 5 weight percent of a modification agent is added in relation to the cellulose
 the spinning gamma value of the viscose lies between 50 and 68, preferably between 55 and 58
 the spinning viscosity equals 50 to 120 falling ball seconds
 the temperature of the spinning bath equals 34° C. to 48° C.
 the following spinning bath concentrations are used
 H$_2$SO$_4$ 68-90 g/l
 Na$_2$SO$_4$ 90-160 g/l
 ZnSO$_4$ 30-65 g/l
 the final drawing off from the spinning bath is performed at a speed of between 15 and 60 m/min.

Another flame-retardant cellulosic man-made fiber in accordance with the invention is a lyocell fiber which is produced using a direct spinning process, wherein the direct solvent for the cellulose is preferably a tertiary amine oxide. N-methyl morpholine oxide (NMMO), which is already being used at commercial level, is particularly well suited as a direct solvent.

Likewise ionic liquids, such as those known from DE102005062608, can be used as a direct solvent for cellulose.

The production of lyocell fibers according to the amine oxide process is performed in the following steps:

1) Contacting the disintegrated pulp with an aqueous N-methyl morpholine oxide (NMMO) solution.
2) Evaporation of excess quantity of water when shearing until a fiber-free spinning mass has formed.
3) Extrusion of the spinning mass through spinnerets, stretching in an air gap, precipitation of the cellulose in an aqueous spinning bath containing NMMO, washing and drying.

As an alternative, the production of the spinning mass can also be performed via the direct dissolution of the pulp in NMMO, containing approx. 13% water (NMMO monohydrate) in e.g. an extruder.

The addition of the flame-retardant agent can be performed in powder form or as a dispersion in water or in aqueous NMMO in step 1.

The flame-retardant agent can also be added to the spinning mass in the form of a dispersion in NMMO, whereby the NMMO has a water content of between 13 weight percent and 20 weight percent.

As an alternative, the flame-retardant agent can be added in powder form in an extruder.

The average particle size of the flame-retardant agent should be clearly below half the fiber diameter, preferably under 10% of the fiber diameter.

A flame-retardant agent, which was subjected to an additional purification step with diluted acid, has proven to be particularly well suited to the lyocell process.

One highly suited process for the production of a flame-retardant agent for use in cellulosic fibers comprises the following steps:
  (a) Reaction of at least one tetrakis hydroxyalkyl phosphonium compound with at least one nitrogen compound, selected from the group of urea, thiourea, biuret, melamine, ethylene urea, guanidine and 2-cyanoguanidine, to obtain a polymer whereby the molar ratio of the tetrakis hydroxymethyl phosphonium compound to the nitrogen compound lies in the range of 1:(0.05 to 2.0), preferably in the rage of 1:(0.5 to 1.5) and most preferably in the range of 1:(0.65 to 1.2),
  (a') Cross-linking of the polymer obtained in process step (a) with the help of ammonia and
  (b) Oxidation of the phosphorus contained in the cross-linked polymer as a result of adding an oxidation agent in order to obtain the flame-retardant agent.

The first step of the production process (a) and/or the steps (a) and (a') serves respectively serve to produce a polymer by reacting the at least one tetrakis hydroxyalkyl phosphonium compound with at least one nitrogen compound selected from the group of ammonia, urea, thiourea, biuret, melamine, ethylene urea, guanidine and 2-cyanoguanidine.

The hydroxyalkyl groups of the tetrakis hydroxyalkyl phosphonium compounds are hydroxymethyl, hydroxyethyl, hydroxypropyl or hydroxybutyl groups.

The at least one tetrakis hydroxyalkyl phosphonium compound, preferably is a tetrakis hydroxymethyl phosphonium compound, hereinafter also named "THP", with the general formula $(P^+(CH_2OH)_4)_t X^-$, or also the blends of compounds of this kind whereby $X^-$ stands for an anion and t for the valence of this anion. t can thereby stand for a whole number of 1 or 2. For example sulphate, hydrogen sulphate, phosphate, mono or dihydrogen phosphate, acetate or halogen anions, such as fluoride, chloride and bromide, are suitable as anion $X^-$.

With the at least one nitrogen compound, which is reacted in the process steps (a) and (a') with the tetrakis hydroxyalkyl phosphonium compound, meant one compound, two compounds, three compounds or several compounds selected from the group of ammonia, urea, thiourea, biuret, melamine, ethylene urea, guanidine and 2-cyanoguanidine. In accordance with a preferred embodiment of the invention, the nitrogen compound is urea. In accordance with one particularly preferred embodiment of the invention, in process step (a) at least one nitrogen compound, selected from the group urea, thiourea, biuret, melamine, ethylene urea, guanidine and 2-cyanoguanidine is reacted and the resulting polycondensation product is cross-linked with ammonia in a subsequent process step (a').

The reaction (conversion) in process step (a) and as the case may be also in process step (a'), is performed in a solvent in accordance with one preferred embodiment of the invention. The solvent preferably used is water. The content of the at least two compounds to be converted in process step (a) respectively (a') can vary across a wide range and in general it equals 10 weight percent to 90 weight percent, preferably 20 weight percent to 40% weight percent in relation to the overall mass of the reaction mixture used in process step (a) respectively (a'), containing at least the two compounds to be reacted and the solvent.

The molar ratio of the tetrakis hydroxyalkyl phosphonium compound to the nitrogen compound can vary across a wide range and generally lies in the range of 1:(0.05 to 2.0), preferably 1:(0.5 to 1.5), most preferably 1:(0.65 to 1.2). As a result of deliberately selecting this molar ratio, it is ensured that the flame-retardant agent produced in accordance with the invention does not dissolve or only dissolves to a limited extent in the solvents used for the production of flame-retardant cellulose fibers.

The conversion in process step (a) and/or (a') is generally preferred at a temperature in the range of 40 to 120° C., preferably at a temperature in the range of 80 to 100° C. over a period of 1 to 10 hours and preferably over a period of 2 to 6 hours.

In accordance with a general embodiment of the invention, following process step (a), one can cool the reaction mixture which contains the polymer to room temperature, i.e. to a temperature in the range of around 15 to 25° C., and preferably to a temperature of 20° C., prior to further cross-linking of the polymer in process step (a') with ammonia.

In accordance with a preferred embodiment of the invention, one adds one or several dispersing agents to the polymer after performing process step (a) and prior to performing process step (a'), and thus prior to carrying out cross-linking using ammonia. These dispersing agents are preferably selected from the group of poly-vinylpyrrolidone, $C_{14}$-$C_{17}$-alkyl sulfonates, hydroxylpropyl cellulose (HPC) and polyethylene glycol (PEG). The dispersing agent thereby serves to stabilise the components in the composition and prevents the agglomeration of polymers in the subsequent cross-linking reaction in process step (a'). Typically the at least one dispersion agent is in a concentration in the range of 0.01 weight percent to 3 weight percent, preferably in the range of 0.1 weight percent to 1 weight percent, in relation to the reaction mixture.

If the production of the polymer is performed in two stages, with process steps (a) and (a'), then ammonia is added in process step (a') in a molar ratio to the tetrakis hydroxymethyl phosphonium compound in the range of (1 to 4.0): 1, preferably in the range of (1.2 to 3.5): 1, most preferably in the range of (1.5 to 2.0): 1. In this respect ammonia is added according to a preferred embodiment of the invention, until the reaction mixture reaches a pH-value in the range of 7 to 10, preferably in the range of 8 to 9. In this way the polymer obtained in step (a) is cross-linked by means of ammonia in process step (a') and a precursor of the flame-retardant agent is obtained, which is oxidized in the subsequent step, process step (b). The duration of the conversion in process step (a') generally lies in the range of 1 min. to 60 min.

The oxidation in process step (b) can be done with the help of the usual oxidation agents such as hydrogen peroxide, ammonium persulphate, air (oxygen) and perchloric acid. The molar ratio between the preliminary stage of the flame-retardant agent and the oxidation agent is generally around 1:1 to 1:1.2.

The flame-retardant agent obtained in process step (b) is washed with an acid in a subsequent process step (c) in accordance with a preferred embodiment of the invention. In this respect the flame-retardant agent can be pre-purified, using common methods known to the specialist, for example by means of filtration. The acid employed in process step (c) is generally selected from the group of HCl, $H_2SO_4$, $H_3PO_4$ and acetic acid. The acid is generally used in a concentration of around 1 to 75%, preferably in a concentration of around 1 to 20%, most preferably in a concentration of around 1 to 9%, diluted in a solvent selected from the group of water, methanol, ethanol, N,N-dimethylformamide (DMF) and N-methyl morpholine oxide (NMMO) or a mixture of these. The solvent given preference for diluting the acid is water. The quantity of acid used to wash the flame-retardant agent obtained in process step (b), can vary across a wide range.

In general, one part by volume of acid per part by volume of flame-retardant agent is used for washing. According to one preferred embodiment of the invention two parts by volume are used and according to one specially preferred embodiment of the invention, three parts by volume of acid are used for washing.

The flame-retardant agent obtained in process step (b) can subsequently be washed with an acid, as described before, and then washed with a solvent one or several times whereby one to two parts by volume of solvent, in relation to the volume of the flame-retardant agent, are used. For washing a solvent is preferably used which is selected from the group of water, methanol, ethanol, N,N-dimethylformamide (DMF), N-Methyl morpholine oxide (NMMO), or a mixture of these. Washing with water is preferable.

The flame-retardant agent can now be subsequently separated from the solvent used by means of a separation process, such as filtration. In general the remaining content of solvent then equals 0 to 40 weight percent, preferably 0 to 20 weight percent and most preferably 0 to 10 weight percent.

To improve the ability to be incorporated into fibers respectively fiber materials, by way of example within the framework of the lyocell or viscose process, it is of advantage to grind the flame-retardant agent for example in a ball, sand, glass pearl or a quartz pearl mill to an average particle size of 0.5 to 5 μm, preferably 1 μm. Grinding can either be done by means of wet grinding or dry grinding.

Production Example 1

Production of a Product with a Mol Ratio of Urea to Tetrakis Hydroxylmethyl Phosponium Sulphate (THPS) of 1 to 0.77

66.2 kg of water, 10.5 kg of urea and 59.5 kg THPS (75% volume percentage) are mixed and subsequently heated for a period of 3 hours at 95 to 98° C. whilst being stirred. The reaction mixture is thereafter cooled down to a temperature below 30° C., 2.1 kg of Duralkan™ TL 844 (PVP 25%) and 30 kg of ammonia (25 volume percentage) are introduced. Using ammonia, the pH-value is set at a value of around 8 and the reaction mixture is allowed to react for 1 min. Following this, 21.3 kg of hydrogen peroxide solution (30 volume percent) is introduced. The solid contained (flame-retardant agent) is separated via a drum filter at a temperature of 40° C., and finally washed with a quantity of water equivalent to the volume of the solid. A white product is obtained with a solid matter content of 35 weight percent.

Production Example 2

Production of a Product with a Molar Ratio of Urea to THPS of 1 to 0.77

68 kg of water, 10.5 kg of urea and 59.5 kg THPS (75 volume percent) are mixed and subsequently stirred for a period of 5 hours at a temperature of 95 to 98° C. The reaction mixture is then cooled down to a temperature below 30° C., 0.5 kg Hostapur™ SAS and 30 kg ammonia (25% volume percent) are subsequently added. Using ammonia, the pH-value of the reaction mixture is set at a value of 8 and the reaction mixture is left to react for 1 min. Then 21.3 kg of hydrogen peroxide solution (30 volume percentage) is introduced. The solid contained (flame-retardant agent) is separated at a temperature of 40° C. via a drum filter, washed with a quantity of water equivalent in volume, then washed with a quantity of 3 volume percent hydrochloric acid equivalent in volume and finally washed with a quantity of water at least equivalent in volume. A white product is obtained with a solid content of 35 weight percent.

The oxidized condensates which are produced in this way from a tetrakis hydroxyalkyl phosphonium salt with a nitrogenous compound are suitable as a flame-retardant agent in a cellulosic moulded body.

Urea or ammonia are preferred as the nitrogenous compound.

The tetrakis hydroxyalkyl phosphonium compound is preferably a tetrakis hydroxymethyl phosphonium salt.

The share of flame-retardant agent in the cellulosic man-made fiber, in the form of a viscose or lyocell fiber, can be between 5 weight percent and 50 weight percent, preferably between 10 weight percent and 30 weight percent, most preferably between 15 weight percent and 25 weight percent in relation to the fiber. When the share is too low, the flame-retardant effect is insufficient, with shares above this limit, the mechanical properties of the fiber deteriorate excessively. A flame-retardant cellulosic man-made fiber can be obtained with these shares which is characterized by the fact that the tenacity in a conditioned state equals from 18 cN/tex to 50 cN/tex.

In addition, the flame-retardant cellulosic man-made fiber can contain additional additives, such as dyestuffs or bactericides.

In the final product (textile fabric), the cellulosic man-made fiber in accordance with the invention fulfils the requirements according to EN ISO 14 116 (previously EN 533) classification "limited flame spread index 3", when testing in accordance with EN ISO 15025:2002 process B—edge flaming.

In the test procedure according to EN ISO 15025:2002, a defined flame from a stipulated burner is directed at the surface (process A) or the lower edge (process B) of vertically arranged textile samples for 10 s. The spreading of the flame and the afterglowing as well as the formation of particles dropping off and burning particles dropping off, are to be recorded.

The requirements in EN ISO 14 116 for the "limited flame index 3", are as follows:

The flame is not allowed to reach the upper edge on any of the test bodies

None of the test bodies should release burning particles

The afterglow should not spread from the carbonised part of the test body to the undamaged part The subsequent burning time must be below two seconds A yarn can be spun from the fiber in accordance with the invention which can be further processed to a textile fabric. The fiber in accordance with the invention can also be used to produce non-wovens.

The textile fabric resp. non-woven produced from the fiber in accordance with the invention fulfilled the requirements of EN ISO 14 116 classification "limited flame spread index 3", when testing according to EN ISO 15025:2002 process B—edge flaming.

The yarn, textile fabric or nonwoven containing the flame-retardant cellulosic man-made fiber in accordance with the invention can be blended with fibers of natural or synthetic origin. The fibers of natural or synthetic origin can be either inherently flame-retardant or be finished in this way. Examples of this are (flame-retardant) polyester, modacryl, para- and meta-polyaramide, polyamide-imide (Kermel®), (flame-retardant) wool, polybenzimidazol (PBI), polyimide (P84®), polyamide, (flame-retardant) polyamide, flame-retardant acrylic fibers, melamine fibers, polyphenylene sulphide (PPS), polytetrafluorethylene (PTFE), glass fibers, cotton, silk, carbon fibers, oxidized thermally stabilized polyacrylonitrile fibers (PANOX®) and electrically conductive fibers and blends of these fibers.

In particular para- and meta-polyaramide- and/or polyimide fibers are particularly well suited for blending with the flame-retardant man-made fibers according to the invention.

The applicational purpose of the fiber in accordance with the invention or fiber blends containing the fiber in accordance with the invention, is in all kinds of protective clothing such as e.g. fireman uniforms, protective clothing against contact with molten metals, underwear and uniform parts in the military sector, textile materials in the public sector such as e.g. curtains and seat covers, textiles in means of transportation such as e.g. airline seats, flame-retardant outer and intermediate sheets (fire blocker) consisting of a textile or non-woven material e.g. for mattresses.

Example 1

A viscose with a composition of 6.0% cellulose/6.5% NaOH was made from a beech pulp (R18=97.5%) using 40% $CS_2$. To the viscose with a spinning gamma value of 62 and a viscosity of 120 falling ball seconds, a modifying agent (2% dimethylamine and 1% polyethylene glycol 2000, always in relation to cellulose) and 22% in relation to cellulose of the flame-retardant agent according to Production example 1, in the form of a 12 weight percent dispersion in 60 weight percent NMMO, were added. The modified viscose was spun with 60 μm spinnerets into a spinning bath with the composition 72 g/l sulphuric acid, 120 g/l sodium sulphate and 60 g/l zinc sulphate with a temperature of 38° C., stretched to 120% inside a second bath (water with 95° C.) and finally drawn off at 42 m/min. The after-treatment (hot diluted $H_2SO_4$/water/desulphurizing/water/bleaching/water/finishing agent) was performed according to well known methods.

The dried fibers were processed to a yarn of Nm 30 and these were in turn processed to a knitted stocking with a mass per unit area of 200 g/m², using a circular knitting machine.

The knitted stocking was subjected to the vertical flame test according to EN ISO 15025:2002 process B—edge flaming. The results of the flame test are shown in Table 3 and the fiber data in Table 1.

TABLE 1

| Example | Fiber thickness [dtex] | Tensile strength conditioned [cN/tex] | Breaking elongation conditioned [%] |
|---|---|---|---|
| 1 | 2.17 | 20.1 | 12.3 |

Example 2

22% in relation to cellulose of the flame-retardant agent according to production Example 1 in the form of a 12 weight percent dispersion in 60 weight percent NMMO were added to the slurry (mixture of pulp/aqueous NMMO) and water was evaporated to yield a fiber-free spinning solution with the composition 12% cellulose/77% NMMO/11% water. A sulphate-high alpha pulp was used as pulp.

The spinning mass was spun to 2.2 dtex fibers, using the well-known wet-dry spinning process with a spinning temperature of 110° C. with the help of a 100 μm spinneret into a spinning bath containing 25% NMMO with a temperature of 20° C. The washed and dried fibers were processed as described in Example 1 to a knitted stocking and then subjected to the vertical flame test according to EN ISO 15025:2002 process B—edge flaming. The results of this flame test are shown in Table 3 and the fiber data are shown in Table 2.

Example 3

The same procedure was followed as in Example 2, however, a flame-retardant agent was used according to Production example 2. The results of the flame test can be found in Table 3 and the fiber data in Table 2.

TABLE 2

| Example | Yield Flame-retardant agent [%] of input | Tensile strength conditioned [cN/tex] | Breaking elongation conditioned [%] |
|---|---|---|---|
| 2 | 95.1 | 34.1 | 13.4 |
| 3 | 99.3 | 34.3 | 11.6 |

TABLE 3

| | | Burning behaviour according to EN ISO 15025:2002 | |
|---|---|---|---|
| Example | Phosphorus-content [%] | After-burning time [s] | Degree of destruction [mm] |
| 1 | 2.1 | 0 | 186 |
| 2 | 2.2 | 0 | 69 |
| 3 | 2.5 | 0 | 7 |

The invention claimed is:

1. A flame retardant fiber consisting of
   (a) a lyocell or modal fiber;
   (b) a flame retardant substance which consists of: a tetrakis hydroxyalkyl phosphonium salt with ammonia; and
   wherein the flame retardant substance is incorporated into the fiber by adding the flame retardant substance to a spinning mass from which the fiber is spun and is uniformly dispersed throughout the fiber, wherein the fiber has a strength of more than 18 cN/tex in a conditioned state.

2. A flame retardant fiber consisting of
   (a) a lyocell or modal fiber;
   (b) a flame retardant substance which consists of an oxidized condensate of a tetrakis hydroxyalkyl phosphonium salt with a nitrogenous compound which contains one or several amine groups; and
   wherein the flame retardant substance is incorporated into the fiber by adding the flame retardant substance to a spinning mass from which the fiber is spun such that the flame retardant substance is uniformly dispersed throughout the fiber, and wherein the fiber has a strength of more than 18 cN/tex in a conditioned state.

3. A flame retardant fiber consisting of
   (a) a lyocell or modal fiber;
   (b) a flame retardant substance which consists of an oxidized condensate of a tetrakis hydroxyalkyl phosphonium salt with ammonia and a nitrogenous compound which contains one or several amine groups; and wherein the flame retardant substance is incorporated into the fiber by adding the flame retardant substance to a spinning mass from which the fiber is spun such that the flame retardant substance is uniformly dispersed throughout the fiber, and wherein the fiber has a strength of more than 18 cN/tex in a conditioned state.

4. The flame-retardant fiber according to claim 1, 2 or 3 wherein the tetrakis hydroxyalkyl phosphonium salt is a tetrakis hydroxymethyl phosphonium salt.

5. The flame-retardant fiber according to claim 1, 2 or 3, wherein the share of flame-retardant substance in the cellulose fiber is between 5 and 50 weight percent.

6. The flame-retardant fiber according to claim 1, 2 or 3, wherein the tenacity is from 18 cN/tex to 50 cN/tex.

7. A yarn containing the flame-retardant fiber according to claim 1, 2 or 3.

8. A textile material containing of the flame-retardant fiber according to claim 1, 2 or 3.

9. A textile material containing the flame-retardant fiber according to claim 1, 2 or 3, wherein the textile material fulfills the demands in accordance with EN ISO 14 116 classification "limited flame spread index 3", when testing according to EN ISO 15025:2002 Process B—edge flaming.

10. A yarn containing the flame-retardant fiber according to claim 1, 2 or 3, wherein the flame-retardant cellulosic fiber is blended with fibers of a natural or synthetic origin.

11. The yarn according to claim 10, wherein the blend comprises fibers, which themselves are inherently flame-retardant or treated with a flame-retardant substance.

12. The yarn according to claim 10, wherein the flame-retardant fiber is present in a blend with polyester, modacryl, para- and meta-Aramide, polyamidimide, flame-retardant wool, polybenzimidazol, polyimide, polyamide, flame-retardant polyamide, flame-retardant acrylic fibers, melamine fibers, polyphenylene sulphide, polytetrafluorethylene, glass fibers, cotton, silk, carbon fibers, oxidized thermally stabilized polyacrylonitrile fibers and electrically conductive fibers and blends of these fibers.

13. The yarn according to claim 12, wherein the flame-retardant fiber is present in a blend with fibers selected from the group consisting of meta- or para-polyaramide fibers and polyimide fibers.

14. The flame-retardant fiber according to claim 2 or 3, wherein the nitrogenous compound is selected from the group consisting of urea, ammonia, thiourea, biuret, melamine, ethylene urea, guanidine and 2-cyanoguanidine.

15. The flame-retardant fiber according to claim 2 or 3, wherein the molar ratio of tetrakis hydroxyalkyl phosphonium salt to the nitrogen compound is in the range of 1:0.05 to 1:2.0.

16. The flame-retardant fiber according to claim 15, wherein the nitrogenous compound is selected from the group consisting of urea, ammonia, thiourea, biuret, melamine, ethylene urea, guanidine and dicyandiamide.

17. The flame-retardant fiber according to claim 16, wherein the nitrogenous compound is urea or ammonia.

18. The flame-retardant fiber according to claim 15, wherein the hydroxyalkyl group of the tetrakis hydroxyalkyl phosphonium salt is selected from the group consisting of hydroxymethyl, hydroxyethyl, hydroxypropyl or hydroxybutyl groups.

* * * * *